(12) United States Patent
Dong et al.

(10) Patent No.: US 11,592,410 B1
(45) Date of Patent: Feb. 28, 2023

(54) WIRELESS MONITORING SYSTEM FOR COAL-GANGUE MIXING RATIO BASED ON NON-HERMITE TECHNOLOGY

(71) Applicant: Shanxi Datong University, Datong (CN)

(72) Inventors: Lijuan Dong, Datong (CN); Haoyan Xi, Datong (CN); Yong Sun, Datong (CN); Yong Dong, Datong (CN); Yue Zhao, Datong (CN); Yanhong Liu, Datong (CN); Fusheng Deng, Datong (CN); Xiaoqiang Su, Datong (CN); Yunlong Shi, Datong (CN)

(73) Assignee: Shanxi Datong University, Datong (CN)

( * ) Notice: Subject to any disclaimer, the term of this patent is extended or adjusted under 35 U.S.C. 154(b) by 0 days.

(21) Appl. No.: 17/882,302

(22) Filed: Aug. 5, 2022

(51) Int. Cl.
| | |
|---|---|
| *G01R 33/36* | (2006.01) |
| *G01N 27/02* | (2006.01) |
| *H01F 17/00* | (2006.01) |
| *E21C 41/18* | (2006.01) |

(52) U.S. Cl.
CPC .......... *G01N 27/028* (2013.01); *E21C 41/18* (2013.01); *H01F 17/0033* (2013.01)

(58) Field of Classification Search
CPC .... G01N 27/028; E21C 41/18; H01F 17/0033
See application file for complete search history.

(56) References Cited

U.S. PATENT DOCUMENTS

| | | | |
|---|---|---|---|
| 2013/0157713 A1* | 6/2013 | Stolarczyk | G08B 21/02 455/550.1 |
| 2013/0187436 A1 | 7/2013 | Wang et al. | |

FOREIGN PATENT DOCUMENTS

| | | |
|---|---|---|
| CN | 101798927 A | 8/2010 |
| CN | 103174449 A | 6/2013 |
| CN | 107340544 A | 11/2017 |
| CN | 110145353 A | 8/2019 |
| CN | 112044798 A | 12/2020 |

OTHER PUBLICATIONS

First Office Action issued in counterpart Chinese Patent Application No. 202110979688.2, dated Feb. 24, 2022.

* cited by examiner

*Primary Examiner* — Alesa Allgood
(74) *Attorney, Agent, or Firm* — Westbridge IP LLC

(57) ABSTRACT

Disclosed is a wireless monitoring system for a coal-gangue mixing ratio based on a non-Hermite technology, including a signal generation monitoring device, an excitation coil, a receiving coil and a parallel plate capacitor. The signal generation monitoring device is connected with the excitation coil; the receiving coil is connected with the parallel plate capacitor to form an LC resonance system; the receiving coil is placed in parallel with the excitation coil, and the axis of the receiving coil and the axis of the excitation coil are on a same horizontal line; the signal generation monitoring device is used to generate a pulse current and collect reflected signals; the excitation coil excites an initial magnetic field based on the generated pulse current, and the LC resonance circuit performs an electromagnetic field induction to generate an induced magnetic field, and feeds back the reflected signals to the signal generation monitoring device.

8 Claims, 4 Drawing Sheets

WIRELESS MONITORING SYSTEM FOR COAL-GANGUE MIXING RATIO BASED ON NON-HERMITE TECHNOLOGY

CROSS-REFERENCE TO RELATED APPLICATIONS

This application claims priority to Chinese Patent Application No. 202110979688.2, filed on Aug. 25, 2021, the contents of which are hereby incorporated by reference.

TECHNICAL FIELD

The application relates to the technical field of coal gangue identification, and to a wireless monitoring system for a coal-gangue mixing ratio based on a non-Hermite technology.

BACKGROUND

Mechanized top coal caving mining technology has advantages of a high yield and a high efficiency. However, gangue falls in a process of coal caving. If there are too many gangues, closing a coal caving port seriously affects a quality of the coal mining. However, closing the coal caving port just after the gangue falls may result in a waste of coal resources. Therefore, an identification of a dynamic coal-gangue mixing degree in the process of the coal caving becomes the key technology of automatic coal caving and determines a best time to close the coal caving port. Nowadays, this technology only depends on naked eyes and experiences of skilled workers, and may give a big error judgment because of a heavy smoke and dust and a weak light in the process of the coal caving.

SUMMARY

To solve a problem of an inaccurate identification of a dynamic coal-gangue mixing degree in a coal caving process in the prior art, the application provides a wireless monitoring system for a coal-gangue mixing ratio based on a non-Hermite technology, so as to automatically and effectively monitor the coal-gangue mixing degree wirelessly.

A technical scheme of the application specifically includes: a signal generation monitoring device, an excitation coil, a receiving coil and a parallel plate capacitor; the signal generation monitoring device is connected with the excitation coil; the receiving coil is connected with the parallel plate capacitor to form an inductor capacitor resonance circuit (LC resonance circuit), and the receiving coil is placed in parallel with the excitation coil, and an axis of the receiving coil and the axis of the excitation coil are on a same horizontal line.

Optionally, the signal generation monitoring device adopts a vector network analyzer.

Optionally, the excitation coil is a single coil; a loop diameter of the single coil is 160 mm, and the single coil is made of a first wire, and a wire diameter of the first wire is 2 mm.

Optionally, the receiving coil adopts a mosquito-repellent coil, and the mosquito-repellent coil has a planar spiral structure; the mosquito-repellent coil is connected with the parallel plate capacitor through wires.

Optionally, a number of coils of the mosquito-repellent coil is 3, a loop radius of the innermost coil of the mosquito-repellent coil is 32 mm, and a distance between two adjacent coils of the mosquito-repellent coil is 20 mm.

Optionally, the reflection coil adopts a spiral coil, and the spiral coil includes a first sub-coil, a second sub-coil and a third sub-coil; the first sub-coil, the second sub-coil and the third sub-coil are in a same horizontal plane and have a same center position; radii of the first sub-coil, the second sub-coil and the third sub-coil are increased in turn; the first sub-coil is provided with a first opening; the third sub-coil is provided with a fourth opening, and the fourth opening does not correspond to the first opening; the second sub-coil is provided with a second opening and a third opening; a position of the first opening corresponds to the position of the second opening, and the position of the third opening corresponds to the position of the fourth opening; the first opening is provided with a first endpoint and a second endpoint; the second opening is provided with a third endpoint and a fourth endpoint; the third opening is provided with a fifth endpoint and a sixth endpoint; the fourth opening is provided with a seventh endpoint and an eighth endpoint; the first endpoint and the third endpoint have corresponding positions and are connected by a first arc wire; the second endpoint and the fourth endpoint have corresponding positions and are connected by a second arc wire; the fifth endpoint and the seventh endpoint have corresponding positions and are connected a third arc wire; the sixth endpoint and the eighth endpoint have corresponding positions and are connected by a fourth arc wire; the third sub-coil is also provided with a fifth opening, and the positions of the fifth opening and the fourth opening are not coincident; the fifth opening is connected with the parallel plate capacitor through wires, and the parallel plate capacitor is connected with a ceramic chip capacitor in parallel.

Optionally, the loop radius of the first sub-coil of the spiral coil is 68 mm, and the distance between adjacent sub-coils of the spiral coil is 20 mm.

Optionally, the distance between two parallel plates in the parallel plate capacitor is 50 mm, and a single plate has a length of 100 mm, a width of 50 mm and a thickness of 1 mm.

The application has following technical effects.

In the application, the signal generation monitoring device is connected with the excitation coil, the excitation coil excites an initial magnetic field, and the receiving coil is connected with the parallel plate capacitor to form an LC resonant circuit; the whole system feeds back the reflected signals to the signal generation monitoring device after receiving an induced magnetic field by a principle of the induced magnetic field; a coal-coal gangue ratio in a sample to be measured is monitored without manual operation through an analysis for the measurement data of the reflected signals by the signal generation monitoring device, so as to realize an automatic and intelligent measurement of the sample to be measured; the sample to be measured has no electrical connection with the receiving coil and the excitation coil during a measurement process, so that a wireless monitoring of the sample to be measured is realized, a space limitation is reduced, and an underground measurement is facilitated; meanwhile, there is no wire connection between the sample to be measured and the excitation coil, thus improving a safety factor of an underground excavation to a certain extent.

The receiving coil and the excitation coil used in the application may be made of ordinary copper wires, and the parallel plate capacitor may be made of aluminium plates. Therefore, the application has a simple process, a low cost and a strong practicability.

BRIEF DESCRIPTION OF THE DRAWINGS

In order to more clearly explain embodiments of the application or technical solutions in the prior art, the following briefly introduces drawings needed in the embodiments.

DETAILED DESCRIPTION OF THE EMBODIMENTS

The following clearly and completely describes technical schemes in embodiments of the application with reference to drawings in the embodiments of the application.

In embodiment 1, the application provides a wireless monitoring system for a coal-gangue mixing ratio based on a non-Hermite technology, including: a signal generation monitoring device 6, an excitation coil 1, a receiving coil and a parallel plate capacitor 4; the receiving coil is connected with the parallel plate capacitor 4 to form an inductor capacitor (LC) resonance circuit; the receiving coil is placed in parallel with the excitation coil 1, and an axis of the receiving coil and the axis of the excitation coil 1 are on a same horizontal line; the signal generation monitoring device 6 is used to generate a pulse current and collect reflected signals of the LC resonance circuit and the excitation coil; and the excitation coil 1 excites an initial magnetic field based on the generated pulse current.

The LC resonance circuit generates an induced magnetic field based on the initial magnetic field.

The excitation coil 1 and the LC resonance circuit form an electromagnetic induction system, and the signal generation monitoring device 6 is connected with the electromagnetic induction system to provide the pulse current for the electromagnetic induction system; meanwhile, the electromagnetic induction system generates the induced magnetic field, and the reflected signals are fed back to the signal generation monitoring device 6 based on the induced magnetic field, and a sample to be measured is placed in the parallel plate capacitor to realize a monitoring of the sample to be measured.

The excitation coil 1 is a single coil, and a loop diameter of the single coil is 160 mm, and it is made of a first wire, and a wire diameter of the first wire is 2 mm.

Figure 1:
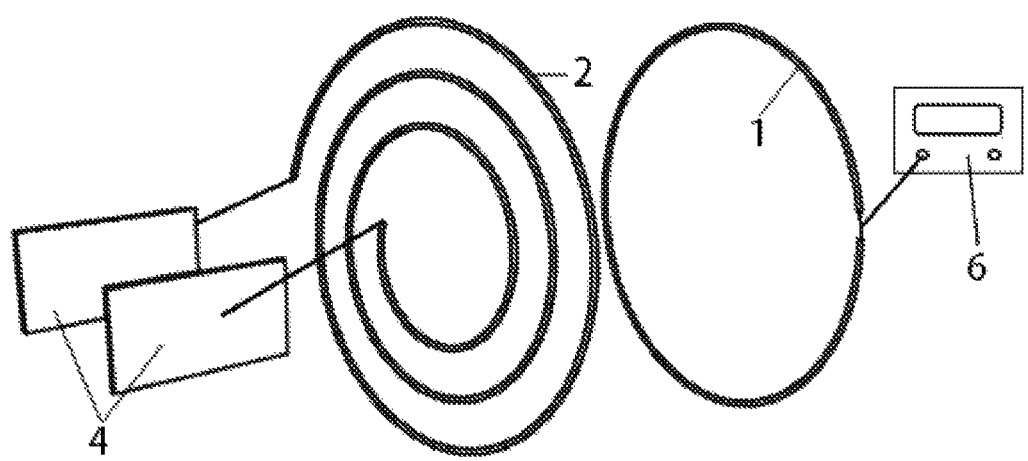
FIG. 1 is a schematic structural diagram of a mosquito-repellent coil system provided by the application.

As shown in FIG. 1, the receiving coil adopts a mosquito-repellent coil 2, which is a planar spiral coil; and the mosquito-repellent coil 2 is connected with the parallel plate capacitor 4 through wires. A number of the coils of the mosquito-repellent coil 2 is 3; a loop radius of the innermost coil of the mosquito-repellent coil 2 is 32 mm and a distance between two adjacent coils is 20 mm. The mosquito-repellent coil 2 is made of a second wire; the wire diameter of the second wire is 2 mm, and the distance between two parallel plates in the parallel plate capacitor is 50 mm.

In embodiment 2, a spiral coil 3 is also be used as the receiving coil of the application, and other structures are the same as those in the embodiment 1, so the other structures are not repeated here.

Figure 2:
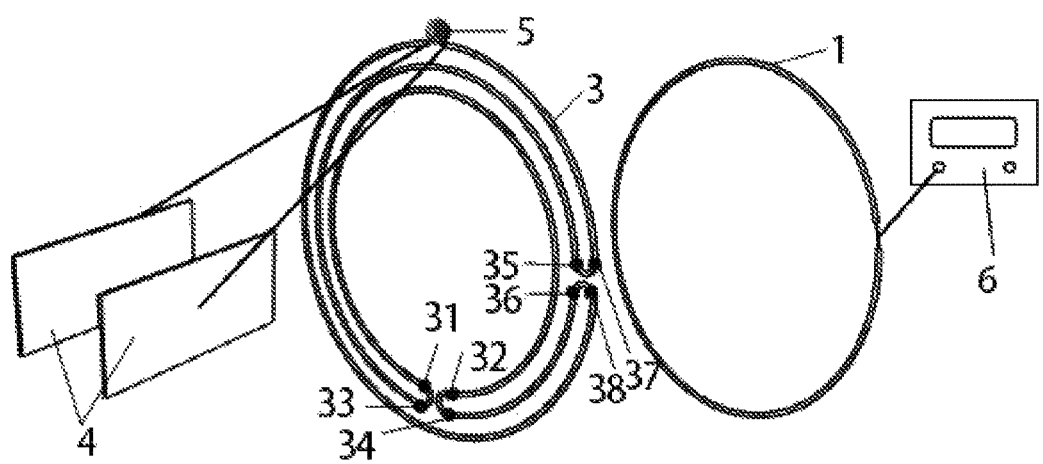
FIG. 2 is a schematic structural diagram of a spiral coil system provided by the application.

As shown in FIG. 2, the receiving coil may also adopt the spiral coil 3; the spiral coil includes a first sub-coil, a second sub-coil and a third sub-coil; the first sub-coil, the second sub-coil and the third sub-coil are in a same horizontal plane and have a same center position; radii of the first sub-coil, the second sub-coil and the third sub-coil increase in turn; the first sub-coil is provided with a first opening; the third sub-coil is provided with a fourth opening, and the fourth opening does not correspond to the first opening; the second sub-coil is provided with a second opening and a third opening; a position of the first opening corresponds to the position of the second opening, and the position of the third opening corresponds to the position of the fourth opening.

The first opening is provided with a first endpoint 31 and a second endpoint 32; the second opening is provided with a third endpoint 33 and a fourth endpoint 34; the third opening is provided with a fifth endpoint 35 and a sixth endpoint 36; the fourth opening is provided with a seventh endpoint 37 and an eighth endpoint 38; the first endpoint 31 and the third endpoint 33 have corresponding positions and are connected by a first arc wire; the second endpoint 32 and the fourth endpoint 34 have corresponding positions and are connected by a second arc wire; the fifth endpoint 35 and the seventh endpoint 37 have corresponding positions and are connected a third arc wire; the sixth endpoint 36 and the eighth endpoint 38 have corresponding positions and are connected by a fourth arc wire.

The third sub-coil is also provided with a fifth opening; the positions of the fifth opening and the fourth opening are not coincident; the fifth opening is connected in series with the parallel plate capacitor 4 through the wires, and the parallel plate capacitor 4 is connected in parallel with a ceramic chip capacitor 5. The radius of the first sub-coil of spiral coil 3 is 68 mm, the distance between adjacent sub-coils of the spiral coil 3 is 20 mm, and the distance between two parallel plates in the parallel plate capacitor is 50 mm.

Figure 3:
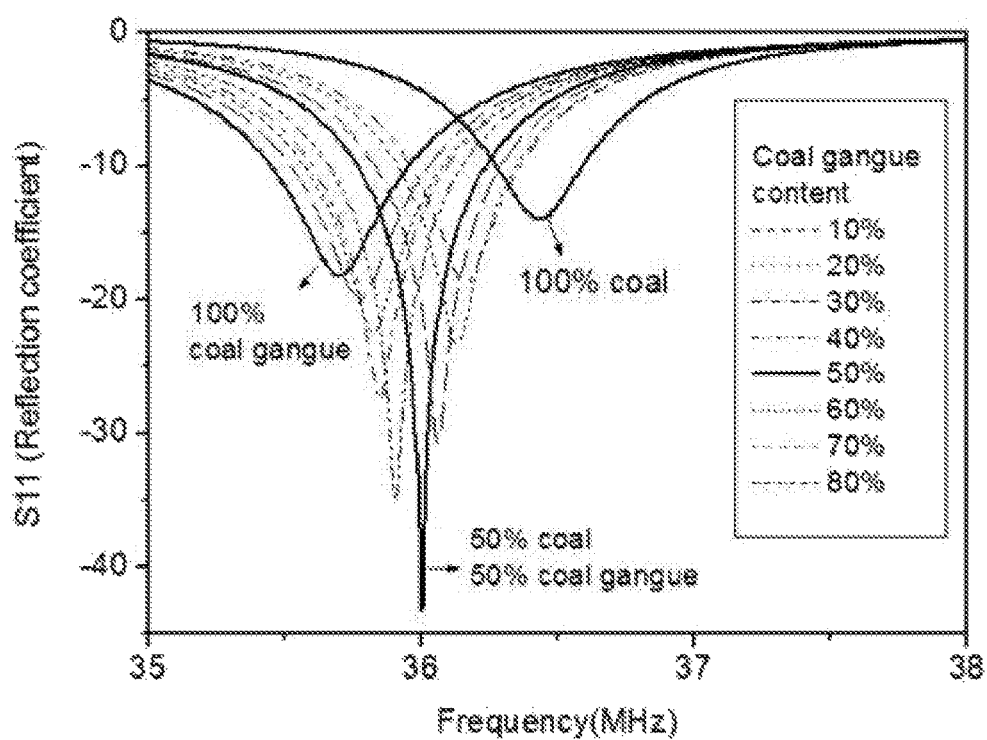
FIG. 3 is a schematic diagram of mosquito-repellent coil monitoring data provided by the application.
Figure 4:
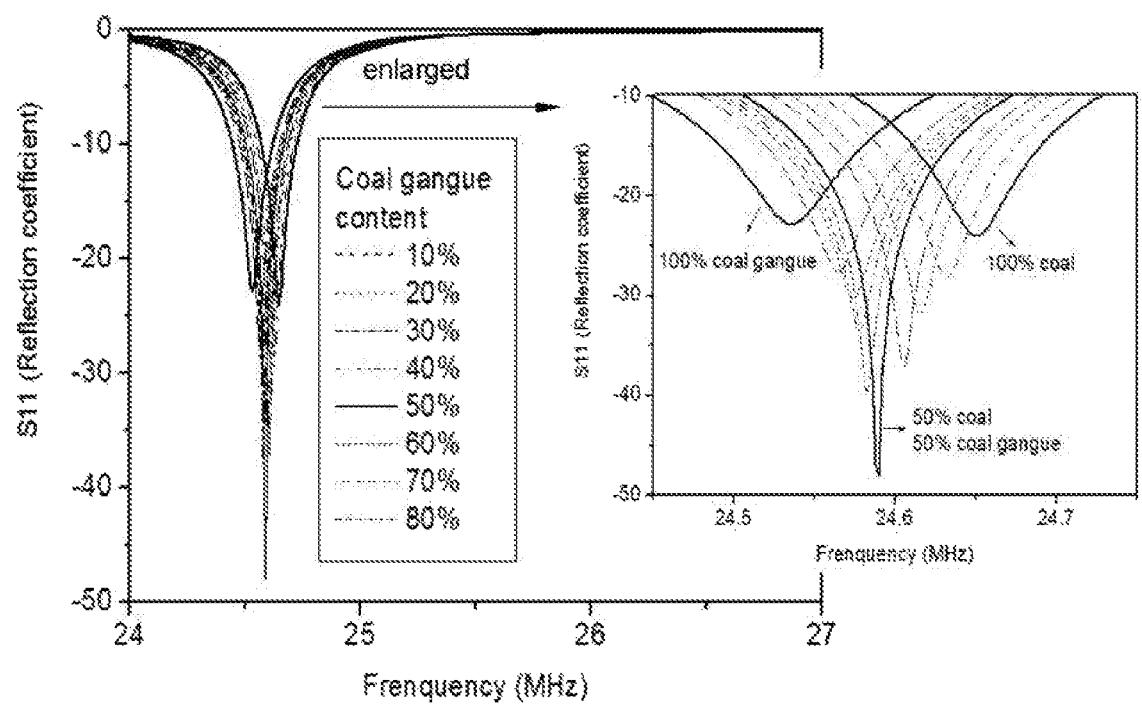
FIG. 4 is a schematic diagram of spiral coil monitoring data provided by the application.

As shown in FIG. 3 and FIG. 4, 50% of coal and coal gangue are selected as resonance points, and then a ratio of the coal and the coal gangue is changed for testing. With a change of a ratio of the coal gangue in the coal, different ratios lead to different resonance frequencies. Therefore, the ratio of the coal gangue in the coal may be monitored according to the change of the frequency. A quality factor is about 44 in the resonance points of monitoring results of a monitoring system using the mosquito-repellent coils. The quality factor is about 105 in the resonance points of the monitoring results of the monitoring system using the spiral coils.

Compared with a mosquito-repellent double-coil system and a spiral double-coil system, the quality factor of the latter is improved a lot.

Firstly, after the mosquito-repellent coil is replaced by a spiral coil, an impedance of the parallel LC circuit is of a maximum value, while the impedance of a series LC circuit is of a minimum value when the circuit is in a resonant state, because a LC equivalent circuit of the coil itself is changed from a parallel connection of the inductance and a capacitance to a series connection of the inductance and the capacitance. The quality factor is inversely proportional to a characteristic impedance when the LC is connected in parallel; and the quality factor is proportional to the characteristic impedance when the LC is connected in series. Therefore, the quality factor of the spiral double-coil system is higher than that of the mosquito-repellent double-coil system.

Lastly, after a capacitor C2 is connected in parallel at the opening of the spiral coil, it is equivalent to that the capacitor C2 connected in parallel is connected in parallel with a coil capacitor C. At this time, C=C+C2, the characteristic impedance becomes larger and the quality factor becomes larger, so the capacitor is connected in parallel at the spiral coil.

What is claimed is:

1. A wireless monitoring system for a coal-gangue mixing ratio based on a non-Hermite technology, comprising a signal generation monitoring device, an excitation coil, a receiving coil and a parallel plate capacitor; wherein
the signal generation monitoring device is connected with the excitation coil;
the receiving coil is connected with the parallel plate capacitor to form an inductor capacitor (LC) resonance circuit;
the receiving coil is placed in parallel with the excitation coil, and an axis of the receiving coil and the axis of the excitation coil are on a same horizontal line;
the signal generation monitoring device is used to generate a pulse current and collect reflected signals of the LC resonance circuit and the excitation coil;
the excitation coil excites an initial magnetic field based on the generated pulse current;
the LC resonance circuit generates an induced magnetic field based on the initial magnetic field; and
the excitation coil and the LC resonance circuit form an electromagnetic induction system, and the signal generation monitoring device is connected with the electromagnetic induction system to provide the pulse current for the electromagnetic induction system;
meanwhile, the electromagnetic induction system generates the induced magnetic field; a sample to be measured is placed in the parallel plate capacitor, and the reflected signals are fed back to the signal generation monitoring device based on the induced magnetic field to realize a monitoring of the sample to be measured.

2. The wireless monitoring system according to claim 1, wherein:
the signal generation monitoring device adopts a vector network analyzer.

3. The wireless monitoring system according to claim 1, wherein:
the excitation coil is a single coil, a loop diameter of the single coil is 160 mm, and the single coil is made of a first wire, and a wire diameter of the first wire is 2 mm.

4. The wireless monitoring system according to claim 1, wherein:
the receiving coil adopts a mosquito-repellent coil, and the mosquito-repellent coil has a plane spiral structure;
the mosquito-repellent coil is connected with the parallel plate capacitor through wires.

5. The wireless monitoring system according to claim 4, wherein:
a number of coils of the mosquito-repellent coil is 3, a loop radius of the innermost coil of the mosquito-repellent coil is 32 mm, and a distance between two adjacent coils of the mosquito-repellent coil is 20 mm.

6. The wireless monitoring system according to claim 1, wherein:
the receiving coil adopts a spiral coil, and the spiral coil comprises a first sub-coil, a second sub-coil and a third sub-coil;
the first sub-coil, the second sub-coil and the third sub-coil are in a same horizontal plane and have a same center position;
radii of the first sub-coil, the second sub-coil and the third sub-coil are increased in turn;
the first sub-coil is provided with a first opening;
the third sub-coil is provided with a fourth opening, and the fourth opening does not correspond to the first opening;
the second sub-coil is provided with a second opening and a third opening, wherein a position of the first opening corresponds to the position of the second opening, and the position of the third opening corresponds to the position of the fourth opening;
the first opening is provided with a first endpoint and a second endpoint;
the second opening is provided with a third endpoint and a fourth endpoint;
the third opening is provided with a fifth endpoint and a sixth endpoint;
the fourth opening is provided with a seventh endpoint and an eighth endpoint;
the first endpoint and the third endpoint have corresponding positions and are connected by a first arc wire;
the second endpoint and the fourth endpoint have corresponding positions and are connected by a second arc wire;
the fifth endpoint and the seventh endpoint have corresponding positions and are connected a third arc wire;
the sixth endpoint and the eighth endpoint have corresponding positions and are connected by a fourth arc wire;
the third sub-coil is also provided with a fifth opening, wherein the positions of the fifth opening and the fourth opening are not coincident; and
the fifth opening is connected with the parallel plate capacitor through the wires, and the parallel plate capacitor is connected with a ceramic chip capacitor in parallel.

7. The wireless monitoring system according to claim 6, wherein:
the loop radius of the first sub-coil of the spiral coil is 68 mm, and the distance between adjacent sub-coils of the spiral coil is 20 mm.

8. The wireless monitoring system according to claim 6, wherein:
the distance between two parallel plates in the parallel plate capacitor is 50 mm, and a single plate has a length of 100 mm, a width of 50 mm and a thickness of 1 mm.

* * * * *